July 21, 1931.  T. J. FAIRLEY  1,815,293
PROCESS OF REFINING TAR
Filed Aug. 3, 1928
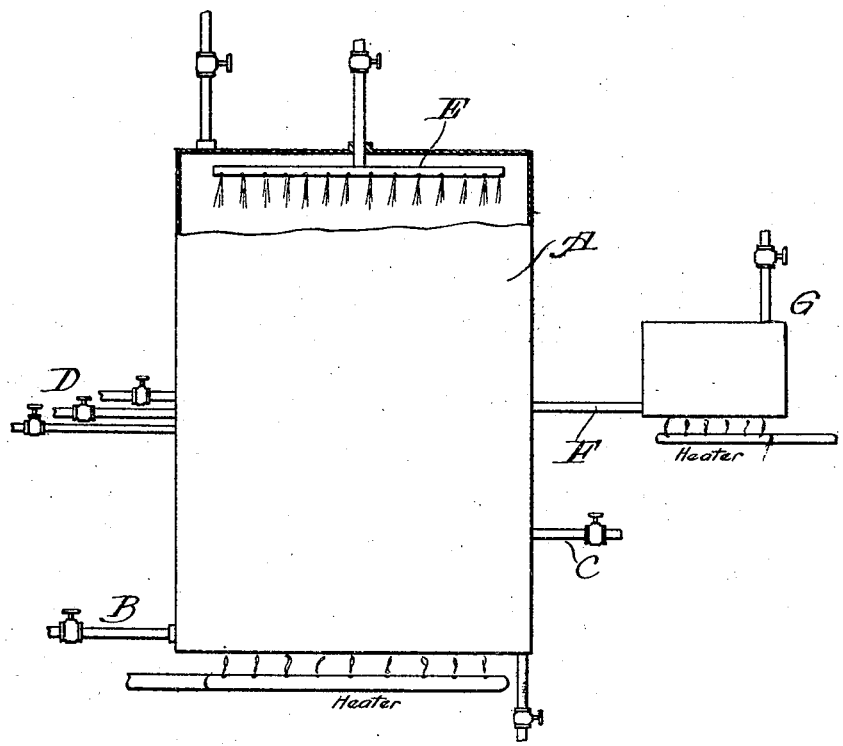
Inventor
Taliaferro J. Fairley
By Cumberman, Bryant Darby
Attorneys Patented July 21, 1931

1,815,293

UNITED STATES PATENT OFFICE

TALIAFERRO J. FAIRLEY, OF STERLINGTON, LOUISIANA, ASSIGNOR TO LOUISIANA PINE PRODUCTS COMPANY, INC., A CORPORATION OF LOUISIANA

PROCESS OF REFINING TAR

Application filed August 3, 1928. Serial No. 297,379.

The present invention relates to the production and refining of tar obtained in the destructive distillation of wood. In the destructive distillation of wood, the crude condensate or distillate obtained usually consists of a number of fractions, and in the case of pine wood, such fractions consist of the light oil, turpentine, pine oil and tar fractions, as well as a considerable amount of acid water.

It is the province of this invention to recover the tar in an absolutely purified state, entirely free from moisture such that it is acceptable for the most scientific and technical uses.

In carrying out the invention, I take crude distillate or condensate from the destructive distillation of wood either before or after the acid water layer has been removed.

The distillate is then treated with a diluting agent, which is preferably one or more of the lighter fractions of a wood distillate, for example, turpentine light oils and pine oil.

The purpose of this dilution is to retain the general nature of the distillate, but at the same time to lower its specific gravity considerably below that of water.

In a crude distillate, such as I propose to treat, there is always present, in addition to the acid water, much trash, charcoal and other undesirable sedimentary matter which is objectionable.

There is also present a very noticeable muck or suspension which it is necessary to remove. This muck has a brownish color and is, in some respects, an emulsion of tar, sedimentary matter and water. Most of this muck usually appears extending from the adjacent layer of distillate down into the lower layer of acid water and sedimentary matter. It is also present to a lesser degree perhaps in the other layers of the distillate, and it is the object of this invention to thoroughly remove it.

The term "crude distillate" therefore as used in the claims is intended to cover all the products distilled from the wood and condensed. Such products as heretofore stated are light oil, turpentine, pine oil, water containing pyroligneous acid and about two per cent (2%) of wood alcohol and pine tar. The constituents of a crude distillate are, of course, well known and they are outlined here for the purposes of clarification. As is usual also the water containing the pyroligneous acid is separated out as thoroughly as possible by gravity before the dilution or treatment of the tar.

It will be understood that with complete purification and removal of sedimentary and objectionable matter, the tar obtained will meet the most strict technical requirements and will possess a specific gravity and viscosity acceptable for most uses.

The amount of diluent employed may vary from 10 to 50% of the amount of the distillate, and an additional function of this diluent consists in the very noticeable change which it produces in the distillate, namely, it has the effect of dissolving or breaking down any lakes or emulsions of tar and water, and hence freeing the trash and sediment, as well as the moisture.

When a batch has been prepared containing a proper amount of the diluent, it is transferred to a washing or scrubbing tank.

This tank is preferably in the form of a tower having means for throwing jets or sprays of water into the batch, with the result that the water will percolate or pass through the batch and collect at the bottom. By submitting the material to a continuous washing, substantially all of the contained objectionable matter will be washed out, and it will be understood that it is only necessary to draw off the water layer at the bottom in order to permit the process to continue.

When the water layer, as drawn off, shows by test that the distillate has been cleaned and purified, the washing is discontinued.

It will be found that the distillate so treated is substantially free from any of the usual objectionable materials, such as trash, sediment, the muck heretofore described, and particularly is free from any traces of acid water and metal substances.

The distillate is now subjected to a heating to remove the lighter volatile fractions, whereupon there remains a residue of tar, which is the final product of my process.

The heating just described can take place in a still employing the usual heating coil, and also a jet of direct steam may be employed for facilitating the distillation. After the lighter volatile constituents have been removed, the steam jets may be discontinued and the residue subjected to the heat of the coil for the purpose of removing any remaining moisture.

It will also be understood that this heating can take place in a still of the type employing direct heat.

After it has been ascertained that all of the water has been removed, the tar residue is run off and stored or barrelled as customary.

An examination of this tar will disclose an entire absence of moisture, as well as complete freedom from trash and sediment, and moreover, it will have a clear cherry-red color.

The specific gravity of the tar recovered and its consequent viscosity are both satisfactory for the strictest technical requirements, and it will be clear that both of these may be regulated to accord with the quality of tar required.

The washing operation may consist of spraying the water into the top of the distillate or into the sides of a column of distillate, or it may consist in the use of both expedients.

It will be understood that the diluted distillate will comprise the upper strata, while the water containing sedimentary matter will constitute the bottom layer. This bottom layer, as stated, may be continuously removed, as is well known.

The tar obtained is also entirely free from any acid content, and does not have any metallic characteristics or properties which frequently are found in tars as now produced.

It will be clear, therefore, that in diluting the distillate so that its specific gravity will be considerably lower than that of the washing fluid and thereafter subjecting it to a thorough washing with water, all of the objectionable matter present in a crude distillate will be thoroughly removed and upon the subsequent heating of the refined distillate, the lighter fractions and all the moisture is driven off, leaving an excellent tar residue, which is free from moisture. The diluent, as heretofore stated, may consist of turpentine, light oils, and in fact any wood distillate fraction or fractions which will serve to thin the crude distillate and lower its specific gravity. In other words, no diluent should be used which will contaminate the distillate and prevent its fractional distillation if that be later determined upon after its removal from the tar.

With respect to the crude distillate, it will be understood that such distillate may be treated in accordance with this process either before it is submitted to a settling tank, and the layer of acid water removed, or after it has been treated in a settling tank and the acid water drawn off. It apparently makes little or no difference when the process is practised except that when the acid water has been preliminarily removed, the amount of washing required is not so extensive, and in some cases, the amount of diluent may be reduced.

The term "light oil" as used in the specifications and claims is intended to identify a product of the thermal decomposition of resinous wood having a lower specific gravity and a correspondingly lower boiling range than turpentine. This product, while mostly distilling from the wood during the period of the last charring, is the most volatile product obtained from the destructive distillation of pine wood and is obtained in smaller quantity than any of the other products, its yield being approximately two gallons per ton of wood treated. It has an empyreumatic odor which is disagreeable and if a thorough separation of it is not made from the turpentine and other products it will render them objectionable and unsalable. Very few uses have been found for this product and aside from a small demand for use in disinfectants, there is practically no market for it. For this reason and for the further reason that it was discovered that the product was the most effective solvent for pine tar, pitch and other wood products, it was used in the connection covered by the specifications. The product has a boiling range of from 86 degrees C. to 150 degrees C., and a specific gravity of substantially 0.850.

The drawings show diagrammatically a vessel preferably vertically disposed and of suitable size. The crude liquor obtained from the destructive distillation of wood such as resinous wood is pumped into the vessel A through pipe D, which is provided with suitable valves and may take the form of a pipe having several branch inlets each controlled by separate valves. This pipe D may also serve to drain the liquor from the washer A after the operation. The vessel is provided with an opening C, through which the diluent is pumped in. After the charge of crude liquor has been pumped into the vessel, a sufficient quantity of the diluent is pumped in and mixed therewith, the proportions as used being approximately 1800 gallons of crude liquor and 500 gallons of diluent. After the crude liquor and the diluent have been mixed, the vessel may be heated if desired in order to promote a quicker mixing which also facilitates the washing operation. The washer A is provided with an opening at its top, which is connected to a suitable spray or cross E and water is supplied continuously or intermittently thereto at ordinary temperature and out through the perforations in the spray or cross. Since the diluted mass in the vessel is of lower specific gravity than the water, the water passes through the charge, thereby washing out all suspended matter, and impurities, including the pyroligneous acid and gravitates to the bottom of the vessel from which it is withdrawn continuously and intermittently during the operation through a pipe B disclosed adjacent the bottom of the vessel. The purified distillate may be heated in the still to remove the water and fractions boiling below the tar range or the distillate may be taken off through the pipe D or the pipe F and transferred to a distillation chamber G to remove the lighter fractions and moisture.

I claim:—

1. The process of recovering tar from a tar containing distillate obtained from the destructive distillation of wood, which comprises diluting the distillate with an organic liquid soluble in and inert with respect to said distillate and of lower specific gravity than the distillate to thereby lower the specific gravity of the mass, subjecting the diluted distillate to a washing fluid insoluble in and inert with respect to the diluted distillate and stratifying the diluted distillate separating out the layer of washed distillate and heating the washed distillate to drive off any moisture and the lower boiling fractions to recover the tar.

2. The process of recovering tar from a tar containing distillate obtained from the destructive distillation of wood, which comprises diluting the distillate with a liquid consisting of at least one of the wood distillate fractions to lower the specific gravity of the mass, subjecting the diluted distillate to a washing fluid insoluble in and inert with respect to the diluted distillate and stratifying the diluted distillate, separating out the layer of washed distillate and heating the washed distillate to drive off any moisture and the lower boiling fractions to recover the tar.

3. The process of recovering tar from a tar containing distillate obtained from the destructive distillation of wood, which comprises diluting the distillate with an organic liquid soluble in and inert with respect to said distillate and of lower specific gravity than the distillate to thereby lower the specific gravity of the mass, continuously subjecting the diluted distillate to a washing fluid insoluble in and inert with respect to the diluted distillate and stratifying the diluted distillate, separating out the layer of washed distillate and heating the washed distillate to drive off any moisture and the lower boiling fractions to recover the tar.

4. The process of recovering tar from a tar containing distillate obtained from the destructive distillation of wood, which comprises diluting the distillate with a liquid consisting of at least one of the wood distillate fractions to lower the specific gravity of the mass, washing the diluted distillate with water and stratifying the diluted distillate, separating out the layer of washed distillate and heating the washed distillate to drive off any moisture and the lower boiling fractions to recover the tar.

In testimony whereof I have hereunto set my hand.

TALIAFERRO J. FAIRLEY.